United States Patent [19]

St Jean

[11] Patent Number: 4,623,152

[45] Date of Patent: Nov. 18, 1986

[54] SHAFT SEAL ARRANGEMENT WITH SPLIT HOUSING

[76] Inventor: Richard St Jean, P.O. Box 145, Floyd Knobs, Ind. 47119

[21] Appl. No.: 720,421

[22] Filed: Apr. 5, 1985

[51] Int. Cl.$^4$ .............................................. F16J 15/18
[52] U.S. Cl. ...................................... 277/60; 277/64; 277/105; 277/193
[58] Field of Search ...................... 277/58, 60, 64, 105, 277/106, 192, 193, 195, 197

[56] References Cited

U.S. PATENT DOCUMENTS

| | | | |
|---|---|---|---|
| 589,725 | 9/1897 | Hodge et al. | 277/60 X |
| 947,889 | 2/1910 | Dorsey | 277/193 X |
| 1,174,788 | 3/1916 | Winn | 277/58 X |
| 1,776,797 | 9/1930 | Sheldon | 277/60 |
| 1,971,542 | 8/1934 | Taylor | 277/60 X |
| 3,081,096 | 3/1963 | Woodbury | 277/58 X |
| 3,738,666 | 6/1973 | Adams | 277/58 |

FOREIGN PATENT DOCUMENTS

| | | | |
|---|---|---|---|
| 346038 | 12/1921 | Fed. Rep. of Germany | 277/58 |
| 11463 | 1/1903 | Norway | 277/60 |

*Primary Examiner*—Robert S. Ward
*Attorney, Agent, or Firm*—Edward M. Steutermann

[57] ABSTRACT

An improvement for a stuffing box for sealing a shaft, such as a valve stem, in a first housing, such as a valve body, where the shaft extends through the housing and original seal devices are provided in an annular chamber or packing gland between the housing and the shaft with a first compression device provided to compress the packing longitudinally with respect to the shaft to allow radial expansion of the material and sealing in the packing gland where the present invention provides a second housing, which is generally cylindrical in shape to also surround the shaft and define an annular space and is split into first and second halves adapted to be connected together to surround the shaft and define a second packing gland, a packing compression device, which is longitudinally split and has a bearing surfaces which are adapted to be received in the annular area or packing gland defined by the second housing, so that second packing material can be received within the second packing gland and compressed by the split packing compression device where fastener means are provided to selectively urge the packing compressing device into the second housing to provide a seal between the shaft and the second housing and the first housing.

6 Claims, 3 Drawing Figures

SHAFT SEAL ARRANGEMENT WITH SPLIT HOUSING

BACKGROUND OF THE INVENTION

The present invention relates to a new and useful arrangement for extending the period between substantial maintenance required regularly for the shaft seals of rotary or linear moving shafts, such as valve stems, or other devices where the shaft extends into a fluid containing device, such as a valve body or a tank, and where the seal between the shaft and the outside is provided by means of compressible packing, all as known in the art.

Previous arrangements have typically required that the packing be periodically removed, and replaced with new packing inasmuch as the packing deteriorates for numerous reasons including age, heat, hardening, or other characteristic factors. Typically, the inconvenience occasioned by the failure of the packing around a shaft, for example a valve stem, depends upon the application of the device associated with the seal. For example, in some instances there is little or no inconvenience in shutting down a pipe line in order to replace the packing in a valve. In other arrangements the packing around a valve stem can be allowed to leak for an extended period of time without any substantial damage. However, in other applications, for example valve members utilized on high pressure steam headers, very little leakage can be tolerated because leakage almost immediately leads to failure of the valve and an inconvenient and sometimes dangerous shut down of the associated equipment. In the case of a high pressure steam header, the leak can shut down the entire plant or cause a power outage over an extended area.

The epitome of inconvenience is reached in nuclear power plants where in certain areas, for example areas where nuclear radiation is present, any leakage around valve stems can not be tolerated.

As previously stated, and as a general rule, all packing eventually leaks so the effectiveness of a particular seal arrangement is determined by the period of time which passes between leaks of a substantial nature requiring a shut down of the associated equipment. Accordingly, means to extend the period of time between shut-down of equipment for complete repair of valve seals is of particular importance in the economics of the operation of certain types of equipment, particularly nuclear power facilities.

Very few prior art means are known for extending the life of the packing provided around a rotatable shaft, for example a valve stem.

One such means for extending the life is a process provided by the Furmanite Corporation, wherein the valve housing is taped and a sealant pumped into the packing gland to provide an improved seal between the packing all ready in the housing and the stem. This process generally can be utilized only a few times before it is necessary to discard valve or the associated sealing equipment.

No prior art arrangement is known which permits the attachment of an alternate seal device to an existing seal device where the alternate device remains out of use and of no effect in the operation of the associated seal until such time as a leak develops in the packing gland initially provided for the shaft.

SUMMARY OF THE INVENTION

The present invention provides a new, useful, and highly cost and operationally effective means for extending the periods between the shut down of equipment necessitated by the failure of packing around a valve stem. Devices within the scope of the present invention can be provided as original equipment. However, and even more importantly, devices within the scope of the present invention can be retrofit to most existing packing means utilized for rotatable shafts such as valve stems either prior to a leak or after a seal leak develops.

More importantly, devices within the scope of the present invention can be retrofit to, for example, valves and remain in place without affecting the packing associated therewith so that the valve is sealed by the original packing until such time as the original packing begins to leak and supplemental sealing provided by the present invention is brought into effect either by lateral or radial compression. Further, devices within the scope of the present invention can be disassembled and repacked without shutdown and can be used to reseal radiated steam leaks to eliminate radiation exposure.

More particularly, the present invention provides an improvement for a stuffing box for sealing a shaft, such as a valve stem, in a first housing, such as a valve body, where the shaft extends through the housing and original seal devices are provided in an annular chamber or packing gland between the housing and the shaft with a first compression device is provided to compress the packing longitudinally with respect to the shaft to allow radial expansion of the material and sealing in the packing gland where the present invention provides a second housing, which is generally cylinderical in shape to also surround the shaft and define an annular space and is split into first and second halves adapted to be connected together to surround the shaft and define a second packing gland, a packing compression device, which is longitudinally split and has a bearing surfaces which are adapted to be received in the annular area or packing gland defined by the second housing, so that second packing material can be received within the second packing gland and compressed by the split packing compression device where fastener means are provided to selectively urge the packing compressing device into the second housing to provide a seal between the shaft and the second housing and the first housing.

While various examples within the scope of the present invention are illustrated in the accompanying figures and discussed hereinafter, it will be understood that such illustrations and discussions are not by way of limitation and various other arrangements also within the scope of the present invention will occur to those skilled in the art upon reading the disclosure set forth hereinafter.

BRIEF DESCRIPTION OF THE DRAWINGS

One example of an arrangement within the scope of the present invention is shown in the accompanying drawing wherein.

DETAIL DESCRIPTION OF THE DRAWING

Figure 1:
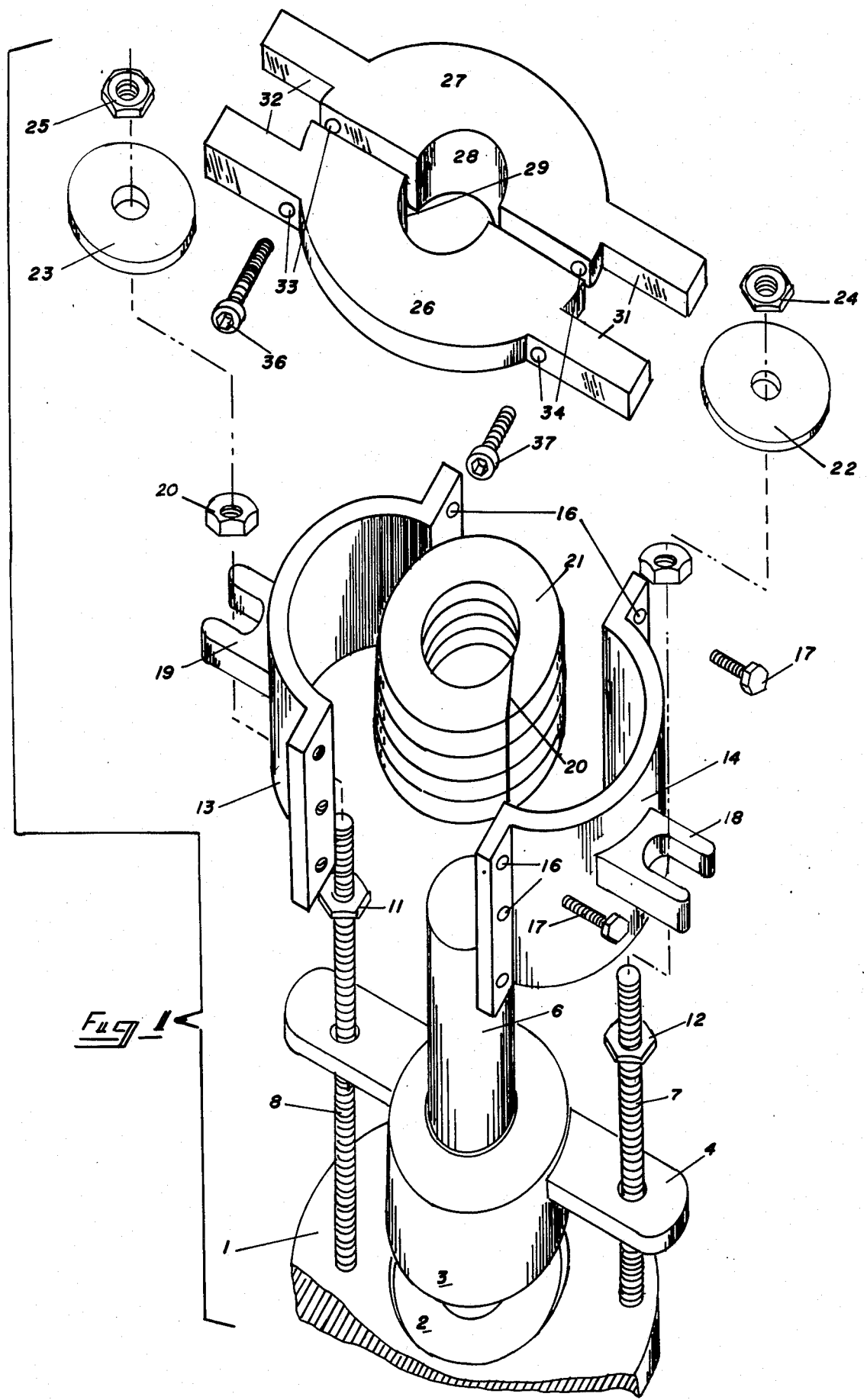
FIG. 1 is an exploded perspective view of an arrangement within the scope of the present invention.

Referring first to FIG. 1, which illustrates an arrangement within the scope of the present invention, a valve body 1, (the part being shown being the packing gland) is illustrated where packing 2, as is known in the art is provided in the packing gland to provides seal for a shaft 6 as also known in the art.

Packing bolts 7 and 8 are shown extending upwardly from the packing gland 1, except, in accordance with one feature of present invention, that the original bolts may be replaced with longer bolts to accommodate the arrangement within the scope of the present invention discussed hereinafter.

A stuffing box follower 3 is shown with arms 4 extending outwardly therefrom to receive the bolts 7 and 8 as is known in the art and the packing nuts 11 and 12 are shown on the bolts 7 and 8 to compress the packing by movement of the follower 3 upon tightening of the bolts.

The arrangement shown is typical of prior art arrangements for sealing a shaft 6, which within the scope of the present invention can be a rotary shaft or a linearly moving shaft.

The arrangement shown, within the scope of the present invention, includes a secondary packing gland comprised of split halves 13 and 14 having flanges 16A to provide bolt holdes 16 to receive bolts 17 to hold the two halves together. While not shown it will be understood that a seal material can be provided between the opposing sides of the elements 13 and 14.

Element 13 carries a bracket 19 adapted to receive the bolt 8 while element 14 carries a bracket 18 adapted to receive bolt 7. Packing 21, which can be skive cut 20, is provided to be received within the packing gland defined by the elements 13 and 14. The skive cut packing is shown to illustrate the fact that secondary assembly provided by the present invention can be installed after the operation of the valve associated with the packing gland 1 has commenced or the arrangement can be installed prior to commencement of the operation of the device.

The use of skive cut packing further provides means for changing the secondary seal at a later date during operation if desired.

Figure 2:
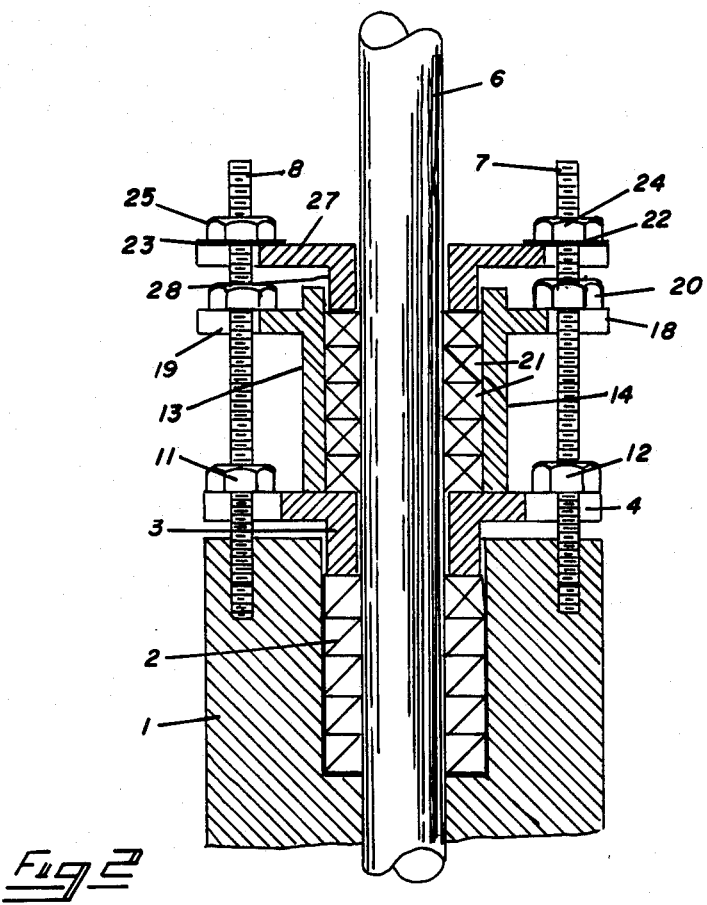
FIG. 2 is an elevational cross sectional view of an assembled arrangement within the scope of the present invention.

Nuts 20 are provided to be received on top of brackets 18 and 19 to urge the entire arrangement on top of the follower 3 as shown in FIG. 2. It will be understood that gasket material (not shown) can be provided if needed, between the elements 13 and 14 and the in the upper surface of follower 3, to prevent leakage through the contact area.

A second follower composed of a split elements 26 and 27 is provided where ears 31 and 32 are provided on opposite sides of the elements and define a space there between to also receive bolts 7 and 8 as shown. Nuts 24 and 25 can be provided above washers 22 and 23 is shown in FIG. 2 so the secondary follower 26, 27 which has a compression lips 28, 29 can be pressed downwardly to engage the top of packing 21 as shown in FIG. 2.

Bolts 36, 37 are provided to be received in drilled and topped apertures 33, 34 to hold the split elements 26, 27 together in aligned relation.

Referring to FIG. 2, which shows an arrangement within the scope of the present invention in assembled form the packing gland 1 is shown with the original packing 2 located within the packing gland. Follower 3 is shown engaging packing 2 and the bolts 7 and 8 are shown located in packing gland 1.

Follower 3 is shown with the bolts 7 and 8 received in the brackets 4 and the nuts 11 and 12 engaging the top of follower 3 to compress packing 2.

The elements 13 and 14 are then shown with the bottom of the elements engaging the top of the follower 3 and the packing rings 21 located in place beneath the follower, in this case follower 27, so that the secondary packing is compressed by tighting nuts 24 and 25.

Figure 3:
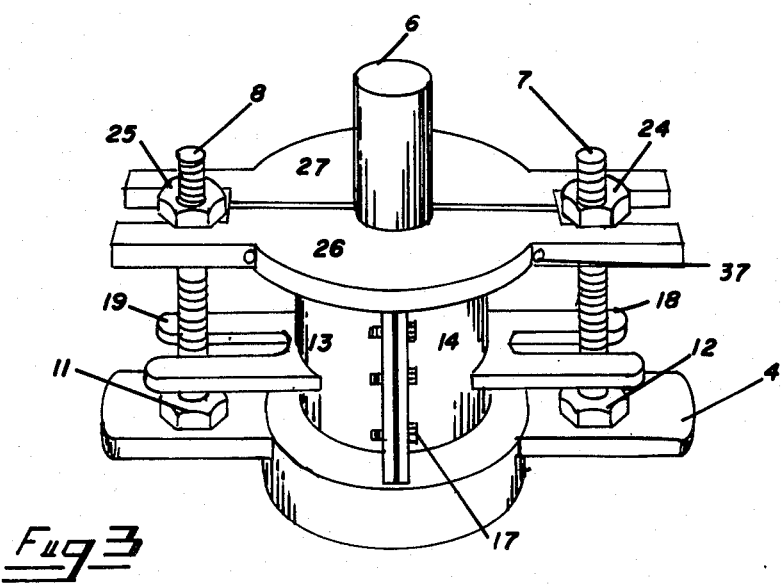
FIG. 3 is a perspective view of the assembled arrangement of FIG. 2.

FIG. 3 is a view showing device in assembled relation with the elements 26, 27 located in position to permit the compression flanges 28, 29 to be received in the packing gland composed of the elements 13 and 14.

It will be understood that the foregoing is but one example within the scope of the present invention and various other arrangements also within the scope of the present invention will occur to those skilled in the art upon reading the disclosure set forth hereinbefore.

The invention claimed is:

1. In a shaft arrangement including a packing gland for sealing a shaft which extends through said gland so an annular chamber is defined between the inner surface of the gland and the shaft, first compressible packing means provided in said annular chamber, first compression means having an opening to receive said shaft therethrough and an upper surface where said first compression means is provided to compress said first packing longitudinally with respect to said shaft to allow radial expansion of said packing material; a generally cylindrical, longitudinally split second packing gland having first and second halves; connector means connecting said first and second halves of said second packing gland together in relation surrounding said shaft; second packing compression means to receive said shaft means and to be received within said second packing gland, second packing material to be received within said second packing gland to be compressed by said second packing compression means, and fastener means provided to selectively urge said second compression device into the second packing gland housing to compress said second packing against said upper surface of said first compression means to provide a seal between said shaft and said second packing gland.

2. The invention of claim 1 wherein said shaft moves linearly through said first and second packing glands.

3. The invention of claim 1 where in said shaft is a rotating shaft.

4. The invention of claim 1 including seal means located between said secondary housing and said first housing.

5. The invention of claim 1 including hold down means to urge said secondary housing toward said first housing.

6. The invention of claim 1 wherein said second compression means is diametrically split into first and second segments and includes fastener means to hold said first and second segments in aligned relation around said shaft means.

* * * * *